(12) United States Patent
Ochi et al.

(10) Patent No.: US 9,085,200 B2
(45) Date of Patent: Jul. 21, 2015

(54) PNEUMATIC TIRE

(75) Inventors: Naoya Ochi, Kodaira (JP); Tomoaki Nemoto, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1221 days.

(21) Appl. No.: 13/054,013

(22) PCT Filed: Jul. 15, 2009

(86) PCT No.: PCT/JP2009/062832
§ 371 (c)(1),
(2), (4) Date: Jan. 13, 2011

(87) PCT Pub. No.: WO2010/008027
PCT Pub. Date: Jan. 21, 2010

(65) Prior Publication Data
US 2011/0114237 A1    May 19, 2011

(30) Foreign Application Priority Data

Jul. 16, 2008 (JP) .................. 2008-185437

(51) Int. Cl.
*B60C 11/11* (2006.01)
*B60C 11/03* (2006.01)
*B60C 11/12* (2006.01)

(52) U.S. Cl.
CPC ........... *B60C 11/0302* (2013.04); *B60C 11/032* (2013.04); *B60C 11/11* (2013.01);
(Continued)

(58) Field of Classification Search
CPC .............. B60C 11/0302; B60C 11/032; B60C 11/0306; B60C 11/0309; B60C 11/11; B60C 11/12; B60C 2011/0341; B60C 2011/0353; B60C 2011/0348; B60C 2011/0381; B60C 2011/1213

USPC .............. 152/209.28, 902, DIG. 3, 209.27, 152/209.18; D12/533, 540, 546–567, D12/900–901
IPC ......................................................... B60C 11/11
See application file for complete search history.

(56) References Cited

U.S. PATENT DOCUMENTS

| | | | |
|---|---|---|---|
| 5,000,239 A | | 3/1991 | Brayer et al. |
| 5,109,904 A | * | 5/1992 | Numata et al. ............ 152/209.22 |
| 6,003,574 A | * | 12/1999 | Boiocchi et al. ............ 152/209.1 |

FOREIGN PATENT DOCUMENTS

| | | |
|---|---|---|
| EP | 0 608 064 A1 | 7/1994 |
| JP | 02-041909 A | 2/1990 |

(Continued)

OTHER PUBLICATIONS

International Search Report for PCT/JP2009/062832, dated Oct. 13, 2009.

(Continued)

*Primary Examiner* — Justin Fischer
*Assistant Examiner* — Philip N Schwartz
(74) *Attorney, Agent, or Firm* — Sughrue Mion, PLLC

(57) ABSTRACT

A pneumatic tire with further improved tire performance on snow and ice. A center block row 30 is formed to a tread portion 16, with second block rows 32A, 32B formed adjacent at each side on the tire width direction outside of the center block row 30. Central lug grooves 24P, 24Q are formed in the center block row 30 so as to have mutually different inclination directions with respect to the tire width direction. End portions 25P at the ground contact rear end side of the central lug grooves 24Q during tire forward rotation are positioned in blocks 33B of the second block row 32B, and end portions 25Q of the ground contact rear end side of the central lug grooves 24P are positioned in blocks 33A of the second block row 32A.

1 Claim, 1 Drawing Sheet

(52) U.S. Cl.
CPC ........ *B60C 11/12* (2013.01); *B60C 2011/0348* (2013.04); *B60C 2011/0381* (2013.04); *B60C 2011/1213* (2013.04)

(56) References Cited

FOREIGN PATENT DOCUMENTS

| | | |
|---|---|---|
| JP | 04-163214 A | 6/1992 |
| JP | 09-193616 A | 7/1997 |
| JP | 2000-108615 A | 4/2000 |
| JP | 2000-229505 A | 8/2000 |
| JP | 2000-255217 A | 9/2000 |
| JP | 2000-264017 A | 9/2000 |
| JP | 2000-326707 A | 11/2000 |
| JP | 2002-248909 A | 9/2002 |
| JP | 2003-237318 A | 8/2003 |
| JP | D1202481 * | 4/2004 |
| JP | 2006-076556 A | 3/2006 |
| JP | 2006-176055 A | 7/2006 |
| JP | 2007-099110 A | 4/2007 |
| WO | 2005/005170 A1 | 1/2005 |

OTHER PUBLICATIONS

Extended European Search Report issued in the corresponding European Application No. 09797952.0 dated Jul. 7, 2011.

* cited by examiner

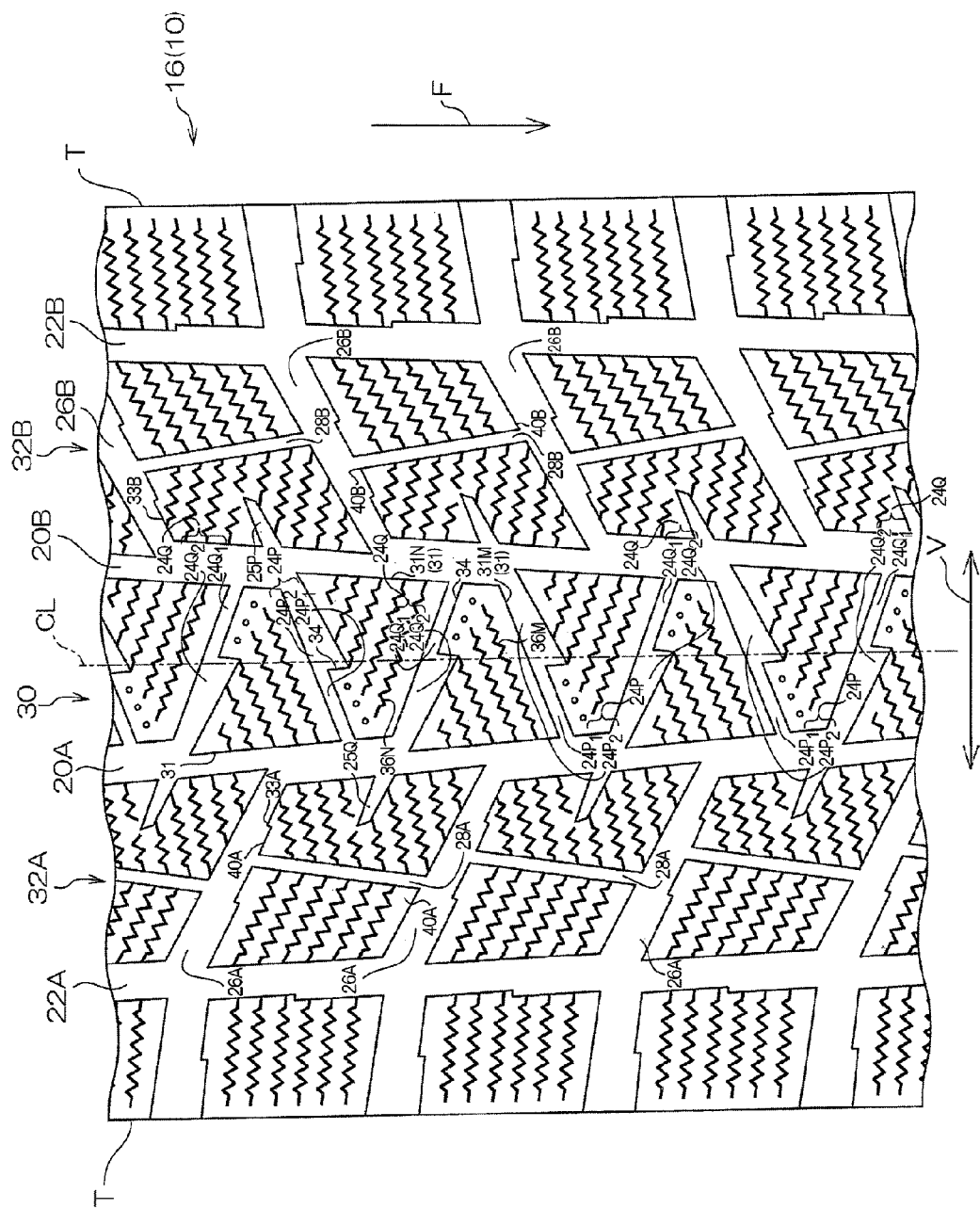

PNEUMATIC TIRE

TECHNICAL FIELD

The present invention relates particularly to an excellent pneumatic tire employed as a studless tire.

BACKGROUND ART

Tires have already been proposed with raised tire performance on snow and ice, such as acceleration performance, control performance and feeling ability. Such tires are, normally, formed with circumferential direction grooves and transverse grooves (lug grooves) in the tread portion (see, for example, Japanese Patent Application Laid-Open (JP-A) Nos. 2000-255217 and 2000-229505).

DISCLOSURE OF THE INVENTION

Problem to be Solved by the Invention

However, there is market demand for even greater improvements in tire performance on snow and ice.
The present invention is made in consideration of the above circumstances and is directed towards providing a pneumatic tire with even higher tire performance on snow and ice.

Method of Solving the Problem

A pneumatic tire according to a first aspect of the present invention includes: circumferential direction grooves formed in a tread portion at both tire width direction sides of a tire center, so as to form a center block row, and second block rows adjacent to the center block row at each outer side in the tire width direction; and central lug grooves formed in a center region of the tread portion and disposed in a zig-zag shape that folds back on itself in the center region, wherein, end portions of the central lug grooves either at a ground contact front end side or a ground contact rear end side are positioned in the blocks configuring the second block rows.

The central region here is the region further to the tire width direction inside of the edges of ground contact when there is tire pressure and loading within the conceivable range during tire use.

In the first aspect of the present invention, central lug grooves are formed within the center region, disposed in a zig-zag shape so as to fold back on themselves within the center region, namely disposed with mutually different inclination directions with respect to the tire width direction.

By forming the central lug grooves in this manner, the block edge length of the central lug grooves is increased, and tire performance on snow, such as acceleration performance and the like, can be raised.

End portions, either at the ground contact front end side or the ground contact rear end side, of the central lug grooves disposed so as to fold back on themselves in the center region, are positioned in the blocks configuring the second block rows. Accordingly, so-called curl-up can be prevented from occurring at the central lug grooves end portions positioned in the blocks, while also increasing the central lug grooves length. This effect is particularly significant with a tire for high loading such as on an SUV.

Sipes in blocks on the tire circumferential direction front and rear sides of a given central lug groove may be configured with mutually different sipe extending directions. It is thereby possible to dispose sipes of different mutual directions with good balance, and it is possible to effectively utilize the sipe edge effect against input from various directions.

Note that were the central lug grooves to be configured so as to extend out past the edges of ground contact then this could easily lead to block rigidity falling off considerably. Furthermore, if the block shape is made larger in order to secure block rigidity, edge length of the lug grooves cannot be secured for the tire as a whole.

The pneumatic tire according to a second aspect of the present invention is formed with transverse lug grooves at both tire circumferential direction sides of the blocks configuring the second block rows, such that the transverse lug grooves are disposed further to the ground contact rear end side during tire forward rotation on progression towards the tire width direction outside, and formed with sub-grooves having narrower widths than that of the circumferential direction grooves in the blocks, with the sub-grooves inclined with respect to the tire circumferential direction such that the ground contact groove position moves towards the tire width direction inside along with movement of the ground contact surface during tire forward rotation, and the sub-grooves not intersecting with the central lug grooves.

Accordingly, due to avoiding block corner portions where the sub-grooves and the transverse lug grooves intersect from becoming too acute, any reduction in block rigidity due to forming the sub-grooves can be suppressed even though the sub-grooves are formed in the blocks configuring the second block rows.

The pneumatic tire according to a third aspect of the present invention has a projecting portion formed to each of the blocks configuring the center block row, so as to project out into a ground contact rear end side region of the lug grooves during tire forward rotation.

Accordingly, rigidity of block corner portions forming the ground contact rear end side region of the lug grooves during tire forward rotation can be raised in each of the blocks configuring the center block row.

Effect of the Invention

According to the present invention, a pneumatic tire can be provided with even higher tire performance on snow and ice.

BRIEF DESCRIPTION OF THE DRAWINGS

FIG. 1 is a plan view showing a tread portion of a pneumatic tire according to a first exemplary embodiment of the present invention.

BEST MODE OF IMPLEMENTING THE INVENTION

Explanation follows regarding an exemplary embodiment of the present invention, with reference to the drawing. The pneumatic tire according to a first exemplary embodiment of the present invention is a studless tire (winter tire) employed on a light truck (LT), and equipped with a carcass folded over bead-cores at both respective edges and with a belt layer disposed at the tire radial direction outside of the carcass. A tread portion 16 is formed at the tire radial direction outside of the belt layer, as shown in FIG. 1, with grooves disposed in the tread portion 16. The pneumatic tire according to the present exemplary embodiment has a specified rotation direction.

Note that the positions of the tread edges T are shown in FIG. 1. The tread edges here indicate the tire width direction outermost ground contact portions when the pneumatic tire is mounted to a standard rim, as defined in the JATMA YEAR BOOK (2007 edition, Japan Automobile Tire Manufacturers Association standards), inflated to an internal pressure of 100% of the pressure (maximum pressure) corresponding to maximum load (load shown in bold type in the internal pressure-load chart) in the JATMA YEAR BOOK for the applicable size/ply rating, and applied with the maximum load. It should be noted that where the location of use or manufacturing location use TRA standards or ETRTO standards, then accordance is made to these respective standards.

Circumferential direction grooves are formed in the tread portion 16 at the two respective tire width direction sides of a tire center (tire equatorial line) CL. In the present exemplary embodiment, there are a total of 4 main grooves formed, inside main grooves 20A, 20B, and outside main grooves 22A, 22B.

A center block row 30 is formed between the inside main grooves 20A, 20B. A second block row 32A is formed between the inside main groove 20A and the outside main groove 22A, and a second block row 32B is formed between the inside main groove 20B and the outside main groove 22B.

Central lug grooves 24 are formed in the center block row 30 so as to cut across the center block row at alternately different inclination directions to the tire width direction V. Namely, disposed around the tire circumferential direction are, alternately: central lug grooves 24P that are connected to the inside main groove 20A and extend out towards the top-right direction of the page, through the inside main groove 20B, and up to the second block row 32B; and central lug grooves 24Q that extend out towards the top-left direction of the page, through the inside main groove 20A, and up to the second block row 32A. In this configuration, under forward tire rotation (namely, when the pneumatic tire 10 according to the present exemplary embodiment is rotated in the forward direction F), each end portion 25P at the ground contact rear end side of the central lug grooves 24P is positioned inside a block 33B configuring the second block row 32B, and each end portion 25Q at the ground contact rear end side of the central lug grooves 24Q is positioned inside a block 33A configuring the second block row 32A. Due to disposing the central lug grooves 24P, 24Q in this manner, the central lug grooves 24 are disposed in a configuration tracing out a zig-zag Z-shape so as to fold back on themselves in a center region. Note that in FIG. 1, the end portions 25P, 25Q at the ground contact rear end side are shown positioned in the blocks 33A, 33B of the second block rows 32A, 32B, however the opposite configuration may be made in which the ground contact front end side is positioned within the blocks of the second block TOWS.

Furthermore, at the two tire circumferential direction sides of the blocks 33A there are transverse lug grooves 26A formed so as to be further to the ground contact rear end side under tire forward rotation on progression towards the tire width direction outside. Sub-grooves 28A are formed in the blocks 33A, inclined with respect to the tire circumferential direction, such that the ground contact groove position moves towards the tire width direction inside together with movement of the ground contact surface during tire forward rotation. At the two tire circumferential direction sides of the block 33B there are also transverse lug grooves 26B formed so as to be further towards the ground contact rear end side under tire forward rotation on progression towards the tire width direction outside. Sub-grooves 28B are formed in the blocks 33B, inclined with respect to the tire circumferential direction, such that the ground contact groove position moves towards the tire width direction inside together with movement of the ground contact surface during tire forward rotation. The sub-grooves 28A, 28B here are grooves that are of finer width than the inside main groove 20A, 20B, and the outside main groove 22A, 22B, however they do not close during running. As can be seen from FIG. 1, the sub-grooves 28A, 28B do not intersect with the central lug grooves 24P, 24Q.

In the present exemplary embodiment, the sub-grooves 28A are formed extending in a direction substantially orthogonal to the central lug grooves 24Q that are shaped so as to jut into the blocks 33A. The sub-grooves 28B are formed extending in a direction substantially orthogonal to the central lug grooves 24P that are shaped so as to jut into the block 33B.

In addition, a projecting portion 34 is formed in each of blocks 31 configuring the center block row 30, projecting out into a ground contact rear end side region of the central lug grooves 24 during tire normal rotation. Accordingly, the central lug grooves 24P traversing the center block row 30 are each configured by a narrow constricted groove portion 24P1 narrowed in width by the projecting portion 34, and a wider width groove portion 24P2 where the projecting portion 34 is not formed. The central lug grooves 24Q traversing the center block row 30 are each configured by a narrow constricted groove portion 24Q1 narrowed in width by the projecting portion 34, and a wider width groove portion 24Q2 where the projecting portion 34 is not formed.

In each of the blocks 31 configuring the center block row 30, sipes in the blocks at the tire circumferential direction front-rear sides of the central lug grooves 24, have alternately different sipe extending directions. Namely, the extending direction of the sipes are alternately different in sipes 36M formed in a block 31M on the tire circumferential direction front side of the central lug groove 24 during tire forward rotation, and sipes 36N formed in a block 31N on the tire circumferential direction rear side or the central lug grooves 24 during tire forward rotation. Consequently, the sipes 36M, 36N of different direction to each other are disposed with good balance, and configuration is made such that the sipe edges can be effectively utilized even if input occurs in either the vertical direction or the horizontal direction.

As explained above, configuration is made in the present exemplary embodiment such that the central lug grooves 24 are disposed so as to trace out a zig-zag in a Z-shape, so as to fold back on themselves in a center region, the ground contact rear side ends of the central lug grooves 24P are positioned in the blocks 33B, and the ground contact rear side ends of the central lug grooves 24Q are positioned in the blocks 33A. Accordingly, block edge length of the central lug grooves 24 is increased, and not only can all of the acceleration performance (traction ability), control performance (braking ability), and the feeling ability on snow be raised, but also so-called curl-up can be prevented from occurring by the end portions 25Q, 25P being positioned respectively in the blocks 33A, 33B as the central lug groove 24 length increases.

The transverse lug grooves 26A are also formed at both sides of the blocks 33A in the tire circumferential direction, so as to be further to the ground contact rear end side during tire forward rotation on progression towards the tire width direction outside. The sub-grooves 28A formed in the block 33A are also inclined with respect to the tire circumferential direction such that the ground contact groove position moves towards the tire width direction inside along with movement of the ground contact surface during tire forward rotation. Consequently, even though the sub-grooves 28A are formed in the blocks 33A configuring the second block row 32A, since block corner portions 40A where the sub-grooves 28A and the transverse lug grooves 26A intersect with each other can be prevented from becoming too acute, any fall in block rigidity due to formation of the sub-grooves 28A can be suppressed. Similarly, in the blocks 33B too, the since the block corner portions 40B where the sub-grooves 28B and the transverse lug grooves 26B intersect with each other can be prevented from becoming too acute, any fall in block rigidity due to formation of the sub-grooves 28B can be suppressed.

Furthermore, the projecting portion 34 is formed to each of the blocks 31 configuring the center block row 30, projecting out into the ground contact rear end side region of the central lug groove 24 during tire forward rotation. Accordingly, in each of the blocks 31 configuring the center block row 30, the rigidity of the block corner portion forming the ground contact rear end side region of the central lug groove 24 during tire forward rotation is raised by the projecting portion 34, and centering feel (handling with small steering input) is raised.

Example Test

In order to confirm the effect of the present invention, the inventors have prepared test samples of a modified example of a pneumatic tire according to the above exemplary embodiment (referred to below as the Example 1 tire), an example of the pneumatic tire according to the above exemplary embodiment (referred to below as the Example 2 tire), an example of a pneumatic tire for comparison (referred to below as Comparative Example tire), and an example of a conventional pneumatic tire (referred to below as Conventional Example tire). The inventors then performed performance tests on snow and evaluated acceleration performance (traction ability), control performance (braking ability), and on-snow feeling ability.

The Example 1 tire is a tire differing from Example 2 tire in that sub-grooves 28 are not formed.

The Conventional Example tire is a tire differing from the Example 1 tire in that a central rib is provided in place of the center block row 30.

The Comparative Example tire is a tire differing from the Conventional Example tire in that center blocks are provided in place of the center rib, with the ground contact ends of side lug grooves not reaching to the blocks configuring the central block row. In the Comparative Example tire, lug grooves intrude into the center rib, with the lug groove end portions positioned within the rib. The sipe inclination directions with respect to the tire circumferential direction are formed so as to be mutually opposite to each other in the block portions of one side in the tire circumferential direction from a given intruding lug groove to the block portions of the other side in the tire circumferential direction from the given lug groove.

In the present Example Test, all of the tires were of a tire size of 265/70/16, were mounted to a standard rim at standard internal pressure, and tests were performed by actual running when fitted to a light truck and in a state of loading with the normal load. The reference here to "standard rim" refers to a standard rim of applicable size as defined for example in the 2007 edition of the JATMA published YEAR BOOK, and "normal load" and "normal internal pressure", similarly, refer to the maximum load and internal pressure for maximum load for the applicable size/ply rating as defined in the YEAR BOOK published by JATMA in 2007. It should be noted that where the location of use or manufacturing location use TRA standards or ETRTO standards, then accordance is made to these respective standards.

In the present Example Test, with respect to acceleration performance, as the traction ability, full throttle is applied from a state of rest and the time (acceleration time) measured until a distance of 50 m is run.

With respect to control performance, the braking distance was measured with full braking applied from an initial speed of 40 km/h on snow until a state of rest, with the average deceleration calculated from the initial speed (40 km/h) and the braking distance.

With respect to the feeling ability on snow, an overall evaluation is given over braking ability, traction ability, straight line characteristics and cornering characteristics over a test course of a packed snow road surface.

For each of the acceleration performance, braking ability, and feeling ability on snow, evaluation indices are calculated to give a relative evaluation of tires of Example 1 tire, Example 2 tire, and Comparative Example tire in an index based on the average deceleration of the tire of Conventional Example tire being an index value of 100. The results are shown in Table 1.

TABLE 1

|  | Conventional Example Tire | Comparative Example Tire | Example 1 tire | Example 2 tire |
| --- | --- | --- | --- | --- |
| Acceleration Performance (Traction Ability) | 100 | 105 | 108 | 108 |
| Control Performance (Braking Ability) | 100 | 105 | 107 | 107 |
| Feeling Ability | 100 | 102 | 103 | 110 |

In the evaluation results of Table 1, the larger the evaluation index the higher the performance on snow, namely indicate better acceleration performance, control performance, and feeling ability on snow. As can be seen from Table 1, evaluation indices for the Comparative Example tire are all higher than the Conventional Example tire. Also the evaluation indices of the Test Sample 1, 2 tires are higher than both those of the Conventional Example tire and the Comparative Example tire. The Example 1 tire shows a much greater improvement in feeling ability on snow in comparison to the Example 2 tire.

Exemplary embodiments of the present invention are explained by way of the above exemplary embodiment, however the above exemplary embodiment is merely an example and various modifications may be implemented within a scope not departing from the spirit. Obviously the scope of rights of the present invention is not limited by the above exemplary embodiment.

The invention claimed is:

1. A pneumatic tire comprising:
   circumferential direction grooves formed in a tread portion at both tire width direction sides of a tire center, so as to form a center block row, and second block rows adjacent to the center block row at each outer side in the tire width direction;
   central lug grooves formed in a center region of the tread portion and disposed in a zig-zag shape that folds back on itself in the center region; and
   transverse lug grooves are formed at both tire circumferential direction sides of the blocks configuring the second block rows, such that the transverse lug grooves are disposed further to the ground contact rear end side during tire forward rotation on progression towards the tire width direction outside,
   wherein end portions of the central lug grooves either at a ground contact front end side or a ground contact rear end side are positioned in the blocks of the second block rows, and
   wherein a width of the transverse lug grooves increases to the outside in the tire width direction.

* * * * *